March 7, 1967 — C. A. ETIENNE — 3,307,456

LIGHT WEIGHT PISTON FOR MOTORS AND THE LIKE

Filed Sept. 28, 1964 — 2 Sheets-Sheet 1

INVENTOR
C. A. Etienne
By *Hiemh, Uethrill & Rushn*
ATTORNEYS

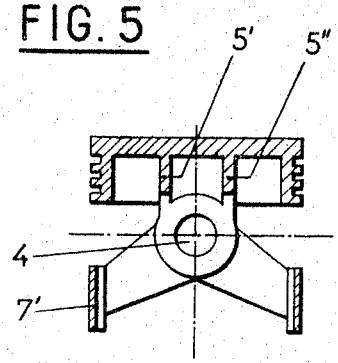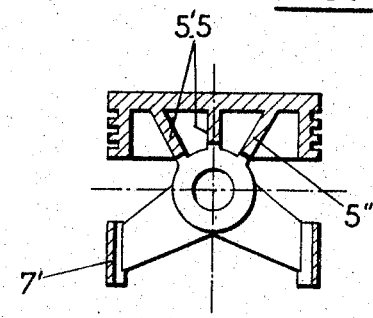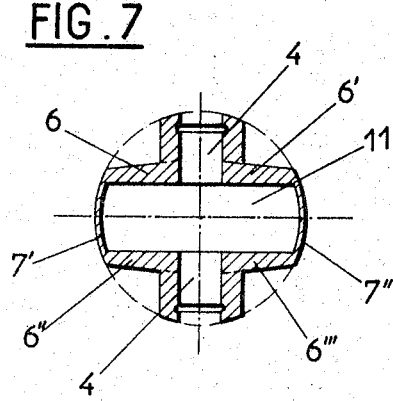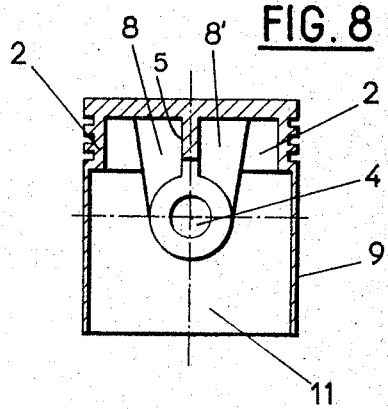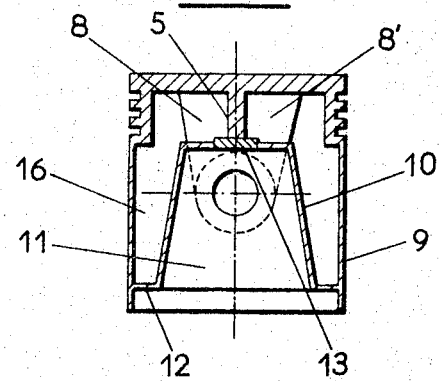

United States Patent Office 3,307,456
Patented Mar. 7, 1967

3,307,456
LIGHT WEIGHT PISTON FOR MOTORS AND THE LIKE
Charles Antoine Etienne, 46 Rue de la Bienfaisance, Paris, France
Filed Sept. 28, 1964, Ser. No. 399,686
Claims priority, application France, Oct. 28, 1963, 952,007, patent 1,394,022; Aug. 10, 1964, 984,669, patent 86,284
3 Claims. (Cl. 92—208)

The maximum speed of rotation of a motor or other piston driven machine (such as a compressor, pump, or the like) is attained when the positive force is balanced by the negative force due to the inertia of the moving parts.

In the calculation of these negative forces, the members subjected to alternating motion, that is to say, the connecting rods, for about a third of their weight, and the pistons for their total weight, engender negative forces which are actually considerable, despite the fact that pistons are now lighter than in the first motors made, when they were often of cast iron.

Moreover, the force exerted on the piston is actually transferred through the skirt which carries the wrist pin bosses, and it follows that it is necessary to make this skirt thick enough to avoid deformation thereof by the cumulative effect of its motion and temperature.

Moreover, the skirt of the piston is necessary only to guide it by preventing it from swinging and the skirt is therefore completely useless if swinging is prevented by other means, except in the case of pistons for two stroke motors in which the skirt also serves as distributor.

The object of the present invention is to provide a new article of manufacture which consists of a piston essentially characterized by the fact that it comprises in combination a piston head provided with the conventional piston ring grooves, a web on the inside of this head which carries the wrist pin bosses, and a light element which resists swinging of the piston about the wrist pin. This element may be a thin skirt connected to the head or an annular member or two arcuate members connected by ribs above the projection.

Referring now to the drawings:

FIG. 5 illustrates in section a piston provided with a pair of webs;

FIG. 6 shows a piston with three webs, the central one of which is perpendicular to the face of the piston, while the others are inclined thereto;

FIG. 7 is a section taken along the line VII—VII of FIG. 4;

FIG. 8 shows a piston according to the invention provided with a skirt for use in a two-stroke motor; and FIG. 9 also shows a piston for a two-stroke motor of larger size.

Figure 1:
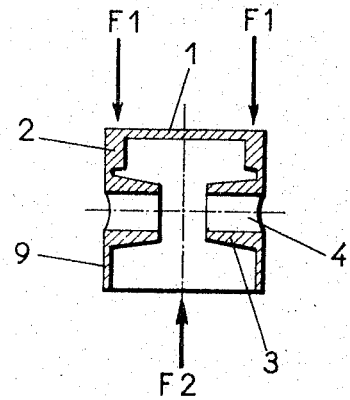
FIG. 1 shows a diagram of the forces which act on an ordinary conventional piston.

FIG. 1 shows schematically the forces exerted on a conventional piston which does not embody the invention, and it will be seen that the force $F^1$ exerted on the top 1 of the piston is transmitted to the pin in the bearings 4 by the circular walls 2 which carry the bosses 3, the lower part 9 of the skirt being thinner because it serves only to guide the piston.

The reactive force $F^2$ acts along the vertical axis of the connecting rod, which substantially corresponds to the axis of the piston. It follows that the larger the diameter of the piston, the further apart are the points at which the forces of action and reaction are applied, and it is therefore necessary to make the skirts of these pistons thick enough at 2 and 9 to avoid deformations due to movement and temperature while the engine is operating.

Figure 2:
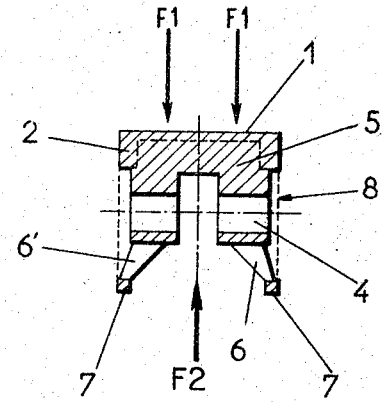
FIG. 2 is a diagram showing the forces which act on a piston according to the invention, which is illustrated in axial section.
Figure 3:
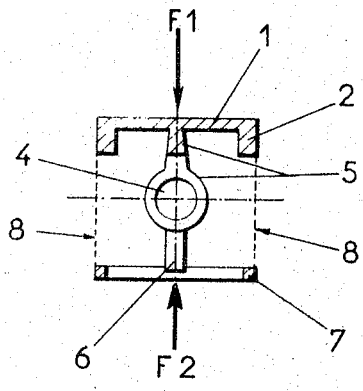
FIG. 3 is an analogous diagram, taken in a section perpendicular to the plane of FIG. 2.

In comparison, FIGS. 2 and 3 show a piston according to the present invention, FIG. 2 being an axial section in one plane, and FIG. 3 an axial section in a plane perpendicular to that of FIG. 2. These figures show that the force applied to the wrist pin is uniformly distributed, with the forces $F^1$ applied closer to the center of the reaction forces $F^2$.

In these figures 1 is the face of the piston, and 2 is the annular head in which the piston rings are seated. The wrist pin is carried at the bottom of a small web 5 which is centrally recessed to admit the connecting rod. Two small brackets 6 and 6' are provided below the web 5 to carry the circular stabilizer 7. The skirt, the outer edge of which is indicated in broken lines, is eliminated, except in the case of two stroke motors, in which it must be retained to open and close the ports.

Figure 4:
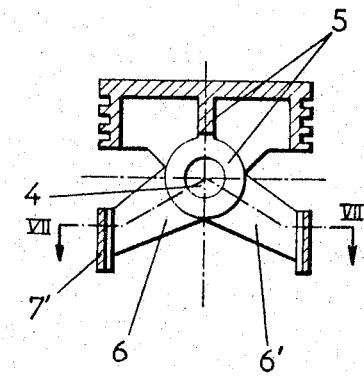
FIG. 4 is a piston comprising a transverse web carrying stabilizing means formed into two arcs.

In the embodiment shown in FIG. 4, the wrist pin is connected to the web in the same manner. The bearing means for the pin likewise carries on each side the brackets 6 and 6' which hold a stabilizer 7' long enough to prevent the piston from swinging.

In the embodiment of FIG. 5 the piston carries two parallel webs 5' and 5" instead of one, which increases the rigidity, the resistance to deformation and the cooling surface of the bottom of the piston.

In the embodiment of FIG. 6 the central web 5 is retained and two lateral webs 5' and 5" are positioned obliquely, but may also be positioned at any other desired angles, or perpendicular to the piston face for the same reasons as in the previous example.

FIG. 7 is a transverse section through the piston of FIG. 4, and shows the bearings 4 for the wrist pin, separated by the opening 11 which admits the connecting rod. Brackets 6, 6', 6" and 6''' carry the guides 7' and 7", each of which is arcuate in said transverse section.

In the embodiment of FIG. 8, which is a piston for a two-stroke motor, the skirt is retained, but is very thin. The piston is here shown with a single web to support the wrist pin bearing, but a plurality of such webs may be used instead, in essentially the same manner as illustrated in previous figures.

In addition to the heavy portion of the piston head into which the ring grooves are cut, each side of the piston, at each end of the wrist pin, is provided with lateral reinforcements 8 and 8' which resist bending of the projection 5, which bending is likely to result when a single web is provided to support the wrist pin bearings 4. The inside 11 of the piston is completely hollow and the skirt 9, which may or may not be pierced by suitable ports, consists of a thin web less than a millimeter thick. Such a web may be obtained only by casting a blank having an outer diameter greater than that ultimately desired and then machining it to its final diameter. This statement is however true only for the present state of the foundry art, which does not permit such thin webs to be cast without flaws.

The embodiment of FIG. 9 is a large piston for a two-stroke motor. A thin inner wall 10 positioned in the lower end of the piston connects the web 5 and the thin skirt 9.

This piston may be made by conventional casting methods, the hollow spaces being formed by cores or shells. The lower chamber 11 which receives the connecting rod is obtained by using a shell, as is the cylindrical outer shape, while the inner chamber 16 is produced by using a core made by a conventional process, for example the Croning process, or any other process capable of producing an integral casting, suitable space being left to accommodate the web or webs 5, as well as the lateral reinforcements 8 and 8'. The core is removed through an opening left for this purpose, which is then stopped up by a plug 13, which may be argon welded in position if the piston is made of an aluminum alloy. This plug is illustrated as being positioned just below the web 5, but may be in any other suitable place, for example, inside the piston rings or in any other place where the material of the piston is thick enough to permit welding.

In general, and especially in the case of two-stroke motors, the degree of expansion at a given place varies according to the mass of metal concentrated at that place, so that pistons must be machined to varying tolerances. For example, the upper end of a given piston is machined to the smallest diameter, thus leaving the largest tolerance between it and the cylinder wall, because it is exposed to the combustion and is therefore more subject to thermal expansion and contraction, while the portions of the same piston between the rings are machined to a smaller tolerance, and the skirt of the same piston is machined to the smallest tolerance of all. However part of the skirt of the piston which encircles the wrist pin bearings and therefore expands more, may be machined to a tolerance one or two hundredths greater than that of the remainder of the skirt in order to avoid seizing of the piston.

It should also be noted that certain pistons, especially those designed for use in four-stroke engines, have the mounting for the wrist pin very close to the working face of the piston since the distance therebetween need be no greater than that required to provide room for the piston ring grooves. In such pistons, the use of webs for carrying the wrist pin bosses is optional, since these bosses are not carried by the skirt but by a small extension from the grooved portion of the piston head.

This makes it necessary to point out that the webs hereinbefore described are needed to transmit force to the wrist pin only to the extent that such force is transmitted thereto by the skirt in conventional pistons, and in those pistons in which all or part of this force is transmitted to bosses mounted directly on the piston head, the webs become optional and serve only as braces which resist lateral displacement of the walls as a consequence of bending forces exerted on the wrist pin by the reaction of the connecting rod, but in the latter case, the elimination of the skirt and its replacement by guide means of smaller dimensions, which has never before been accomplished, remains an essential feature of the invention.

What is claimed is:

1. A light weight piston adapted to be mounted on a wrist pin and reciprocated within a cylinder, said piston comprising in combination a head end provided with a skirt which is peripherally grooved to receive piston rings, two substantially cylindrical aligned wrist pin bosses positioned to receive said wrist pin, supporting means within said piston comprising ta least one rib parallel to the axis of said bosses and connecting said bosses to said head end, and a plurality of stabilizing members extending from said wrist pin bosses away from the head end of said piston, said stabilizing members having bearing surfaces in the form of cylinder segments positioned to wipe equally spaced surfaces on the inside of said cylinder, the sum of the widths of said bearing surfaces taken circumferentially of said piston below said wrist pin bosses being less than half the circumference of said piston.

2. A light weight piston as claimed in claim 1 in which the height of each of said bearing surfaces taken axially of said piston is less than its circumferential width.

3. A light weight piston as claimed in claim 1 in which there are two of said stabilizing members wiping opposite sides of said cylinder.

References Cited by the Examiner

UNITED STATES PATENTS

| 1,283,021 | 10/1918 | Anderson | 92—237 |
| 2,017,630 | 10/1935 | Long | 92—222 |
| 2,771,327 | 11/1956 | Reinberger | 92—225 |

FOREIGN PATENTS

| 310,222 | 8/1933 | Italy. |
| 445,380 | 2/1949 | Italy. |

MARTIN P. SCHWADRON, *Primary Examiner.*

G. BAUM, *Assistant Examiner.*